United States Patent
Takehara et al.

(10) Patent No.: US 12,115,981 B2
(45) Date of Patent: Oct. 15, 2024

(54) VEHICLE DRIVING ASSISTANCE SYSTEM, BASE POINT SIDE DRIVING ASSISTANCE DEVICE

(71) Applicant: Mitsubishi Electric Corporation, Tokyo (JP)

(72) Inventors: Takayoshi Takehara, Tokyo (JP); Masuo Ito, Tokyo (JP); Junya Eto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 324 days.

(21) Appl. No.: 17/595,657

(22) PCT Filed: Jul. 30, 2019

(86) PCT No.: PCT/JP2019/029745
§ 371 (c)(1),
(2) Date: Nov. 22, 2021

(87) PCT Pub. No.: WO2021/019661
PCT Pub. Date: Feb. 4, 2021

(65) Prior Publication Data
US 2022/0219686 A1    Jul. 14, 2022

(51) Int. Cl.
*B60W 30/095* (2012.01)
*G06V 20/56* (2022.01)

(52) U.S. Cl.
CPC ......... *B60W 30/0956* (2013.01); *G06V 20/56* (2022.01); *B60W 2554/4041* (2020.02); *B60W 2556/45* (2020.02); *B60W 2756/10* (2020.02)

(58) Field of Classification Search
CPC ..... B60W 30/0956; B60W 2554/4041; B60W 2756/10; B60W 2556/45; G06V 20/56
See application file for complete search history.

(56) References Cited

FOREIGN PATENT DOCUMENTS

| JP | 2004351977 A | * | 12/2004 |
| JP | 2013125337 A | * | 6/2013 |

OTHER PUBLICATIONS

English Machine Translation of JP-2004351977-A (Year: 2004).*
English Machine Translation of JP-2013125337-A (Year: 2013).*
International Search Report for PCT/JP2019/029745 dated Oct. 29, 2019 [PCT/ISA/210].

* cited by examiner

*Primary Examiner* — Andrew J Cromer
(74) *Attorney, Agent, or Firm* — Sughrue Mion, PLLC; Richard C. Turner

(57) ABSTRACT

A vehicle driving assistance system includes a vehicle side communication system and a base point side communication system. The base point side communication system includes: a receiving part which receives the vehicle information and the video image information; a drive route operation part which searches for a drive route of the vehicle; an object discrimination part which recognizes an object existing on the drive route; a collision judgment part which judges about whether there is a risk of collision with the object; an information determination part which selects video image information for transmitting, according to the type of collision; a transmitting part which transmits the video image information to the vehicle, having the vehicle side communication system. The vehicle driving assistance system is configured so that the video image information from a vehicle can be transmitted according to the situation of driving assistance.

14 Claims, 15 Drawing Sheets

VEHICLE DRIVING ASSISTANCE SYSTEM, BASE POINT SIDE DRIVING ASSISTANCE DEVICE

CROSS REFERENCE TO RELATED APPLICATIONS

This application is a National Stage of International Application No. PCT/JP2019/029745 filed Jul. 30, 2019.

FIELD OF THE INVENTION

The present application relates to a vehicle driving assistance system, a base point side driving assistance device, and an in-vehicle driving assistance device.

BACKGROUND OF THE INVENTION

In order to improve the safety in the road traffic, driving assistance has been performed by transmitting and receiving information between vehicles, which is effective in the driving of a vehicle. For example, in the Patent Document 1, a system is proposed in which, when vehicles are moving in a cascade connection, a subsequent vehicle receives a video image, which is captured by a camera, mounted in a preceding vehicle. The video image is combined with a video image which is captured by the camera of a host vehicle, and the subsequent vehicle displays the combined video image, and thereby, the subsequent vehicle can visualize the field of vision which is interrupted by the preceding vehicle.

CITATION LIST

Patent Literature

Patent Document 1: Japanese Unexamined Patent Application Publication No. 2004-351977

SUMMARY OF THE INVENTION

Technical Problem

In the existing vehicle driving assistance system, communications are performed between vehicles, and information for assisting the drive is transmitted and received. However, when the amount of the information becomes huge, the information processing equipment which is mounted in a vehicle has a large load, and there arises a problem that delays are caused in the processing of information.

The present application is made in order to solve the problem mentioned above, and the aim of the present application is to achieve the non-tight processing of information, whereby a communication device which is provided in a base point is used, and information which will be offered to a vehicle is selected out, and is provided for the vehicle.

Solution to Problem

A vehicle driving assistance system according to the present application comprises:
- a vehicle side communication system which is mounted in a vehicle and transmits vehicle information and video image information, and
- a base point side communication system which is provided in a base point and transmits driving assistance information which is selected out, according to the vehicle information, wherein the base point side communication system includes:
- a receiving part which receives the vehicle information and the video image information,
- a drive route operation part which searches for a drive route of the vehicle, from the vehicle information,
- an object discrimination part which recognizes an object existing on the drive route, which is searched for by the drive route operation part,
- a collision judgment part which judges about whether there is a risk of collision with the object or not, when the object discrimination part recognized that the object exists on the drive route,
- an information determination part which selects video image information for transmitting, from video image information which is received from the vehicle, according to a type of collision which is judged by the collision judgment part, and
- a transmitting part which transmits the video image information to the vehicle.

Advantageous Effects of Invention

In the vehicle driving assistance system according to the present application, the drive route of a vehicle is searched for, using the vehicle information which is acquired from a vehicle. The base point side communication system provides the vehicle side communication system with video image information which is selected according to this drive route. Thereby, the amount of information is restricted, and non-tight processing of information can be achieved.

DESCRIPTION OF EMBODIMENTS

Embodiment 1

Figure 1:
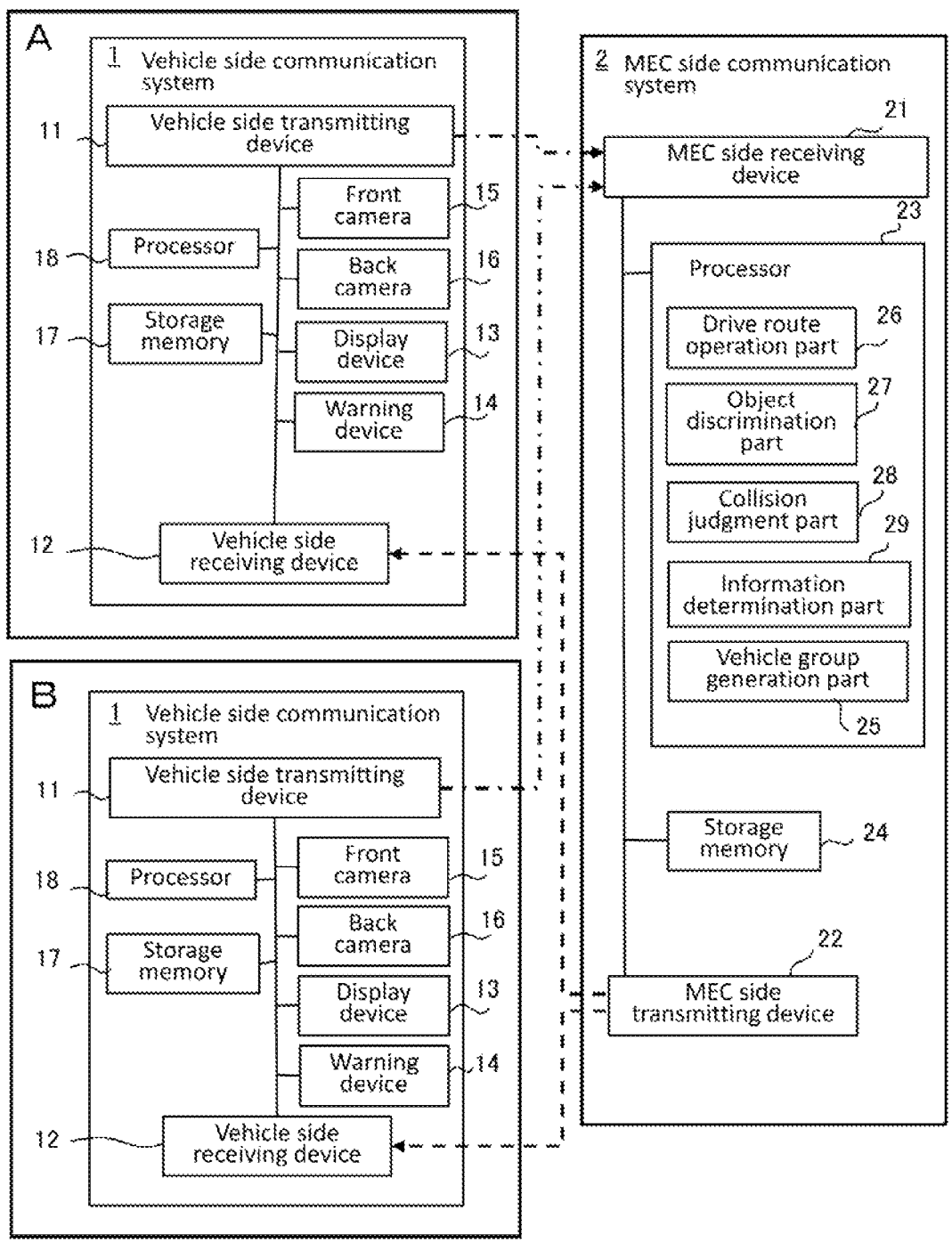
FIG. 1 is a block diagram which shows the configuration of a vehicle driving assistance system, according to the Embodiment 1.

Using drawings, explanation will be made about the Embodiment 1. It is to be noted that, the same or corresponding portions are denoted by the same reference character, in the drawings.

FIG. 1 is a block diagram which shows the configuration of a vehicle driving assistance system. The vehicle driving assistance system is a system which offers information for assisting the driving of a vehicle, where the information is shared between a vehicle side communication system 1 which is mounted in a vehicle and a base point side communication system which is provided in a base point.

The base point indicates a MEC (Multi-access Edge Computing). And the base point side communication system indicates a MEC side communication system which is provided in the MEC. Therefore, in the following explanation, the base point side communication system is explained as a "MEC side communication system 2."

The vehicle side communication system 1 includes: a vehicle side transmitting device 11 which transmits the vehicle information on a host vehicle to the MEC side communication system 2, a vehicle side receiving device 12 which receives the information, sent from the MEC side communication system 2, a display device 13 which displays a video image based on the received information, a warning device 14 which issues a warning, when the information received from the MEC side communication system 2 is an urgent information, a front camera 15 which captures the front side images of a vehicle, and a back camera 16 which captures the rear side images of a vehicle. Moreover, the operations of the display device 13, the warning device 14, the front camera 15, and the back camera 16 are controlled by the processor 18 and the storage memory 17. That is, the processor 18 is configured to control a plurality of devices, by executing the program which is inputted from the storage memory 17.

It is to be noted that, vehicle information, which is transmitted from the vehicle side communication system 1 to the MEC side communication system 2, is the position information on a vehicle, and the operation information on a vehicle. The position information on a vehicle is the information on the current position of a vehicle, and is the information on latitude and longitude. The operation information on a vehicle is the driving operation information, such as "stop," "speed of travelling," "rate of acceleration," and "direction of travelling," which are generated by an accelerator operation, a brake operation, and a wheel operation.

Moreover, the video image information which is taken from the front camera 15 and the back camera 16 is transmitted from the vehicle side communication system 1 to the MEC side communication system 2.

The vehicle information and the video image information are memorized in the storage memory 17, by the processor 18, at a fixed time interval, in accordance with the driving operation of a vehicle. The vehicle side communication system 1 performs control, if required, so that the vehicle information and the video image information can be transmitted from the vehicle side transmitting device 11 to the MEC side communication system 2.

Moreover, information, which is transmitted from the MEC side communication system 2, is received by the vehicle side receiving device 12, and is memorized in the storage memory 17. In addition, according to the contents of the received information, the processor 18 controls various kinds of devices which are mounted in the vehicle. Thereby, the transmitted information is used for assisting the driving of the vehicle.

The vehicle side communication system 1 is mounted in both of the first vehicle A and the second vehicle B, and both of the first vehicle A and the second vehicle B transmit the vehicle information and the video image information to the MEC side communication system 2.

The MEC side communication system 2 is equipped with a MEC side receiving device 21 which receives the vehicle information sent from the vehicle side transmitting device 11, and a MEC side transmitting device 22 which transmits information to the first vehicle A and the second vehicle B.

Based on the vehicle information which is received from a vehicle, the MEC side communication system 2 identifies the vehicle and searches for the drive route of the vehicle. In addition, the MEC side communication system analyzes the information which is needed by the vehicle, according to the drive route of the vehicle, and offers information which is considered to be effective in driving assistance, based on the analysis result.

The MEC side communication system 2 is constituted of a processor 23 and a storage memory 24, which are connected to a bus, where the bus connects the MEC side receiving device 21 and the MEC side transmitting device 22. The processor 23 executes a program which is inputted from the storage memory 24. The processor 23 is configured so that the function of a vehicle group generation part 25, a drive route operation part 26, an object discrimination part 27, a collision judgment part 28, and an information determination part 29 may be achieved by the program.

The vehicle group generation part 25 is contained in the information determination part 29. The vehicle group generation part judges the condition of a group which consists of a plurality of vehicles, based on the vehicle information on each of the plurality of vehicles, which is received by the MEC side receiving device 21, and generates the information on a vehicle group.

The drive route operation part 26 searches for both of the drive routes of the first vehicle A and the second vehicle B, which constitute a vehicle group, based on the vehicle information which is received by the MEC side receiving device 21.

The object discrimination part 27 recognizes an object which exists on the drive route of a vehicle, based on the information on the drive route of the first vehicle A.

When the object discrimination part 27 recognizes that an object exists on the drive route of the first vehicle A, the collision judgment part 28 judges about whether there is a risk of collision between the first vehicle A and the object.

When the collision judgment part 28 judges that there is a risk of collision between the first vehicle A and the object, an assistance to warn that there exists this risk is demanded. For example, this assistance includes Do Not Pass Warning (DNPW), Forward Collision Warning (FCW), Intersection Movement Assist (IMA), Blind Spot Warning (BSW), Left Turn Assist (LTA), Vehicle to Pedestrian (V2P), and Lane Change Warning.

The information determination part 29 selects which vehicle's camera video image to transmit to a warning target vehicle, from among vehicles which constitute a vehicle group, according to the type of collision which is judged by the collision judgment part 28. The camera video image which is selected here is transmitted from the MEC side transmitting device 22 to the first vehicle A.

Figure 2:
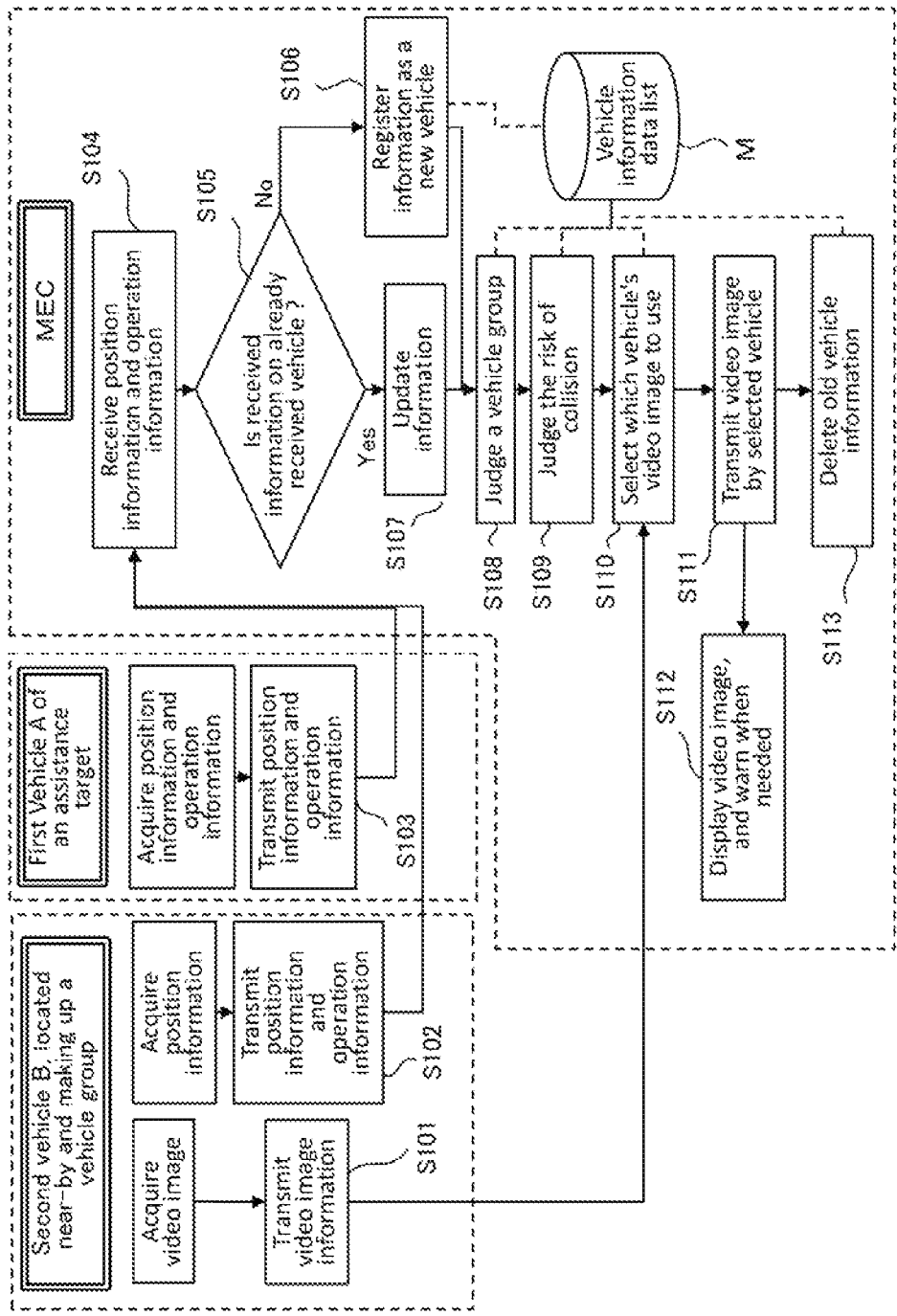
FIG. 2 is a flow chart which shows the operations of the Embodiment 1.

Next, with reference to the flow chart of FIG. 2, explanation will be made about operations of the Embodiment 1, which is configured in this way.

Here, the first vehicle A is defined as a vehicle which conducts a vehicle driving assistance, and explanation is made about a case where, near this first vehicle A, located is a second vehicle B, which makes up a vehicle group and plays as a near-by vehicle.

First, in the second vehicle B which makes up a vehicle group, when video images are acquired with the front camera 15 and the back camera 16, the video image information will be transmitted to the MEC side communication system 2 by the vehicle side transmitting device 11 (Step S101). Moreover, in the second vehicle B which makes up a vehicle group, the position information which is acquired with the in-vehicle GPS equipment and the operation information are transmitted to the MEC side communication system 2 (Step S102).

The first vehicle A, an assistance target, transmits, to the MEC side communication system 2, the position information which is acquired with the in-vehicle GPS equipment and the operation information on the vehicle (Step S103).

In the MEC side communication system 2, the MEC side receiving device 21 receives the vehicle information on the first vehicle A and the vehicle information on the second vehicle B (Step S104). The information determination part judges whether the received vehicle information is the information on a vehicle which is already received or not (Step S105).

When the received vehicle information is not in agreement with the information on a vehicle which is already received, this vehicle information is registered as a new vehicle information in a vehicle information data list M (Step S106).

When the information determination part judges that the vehicle information received in Step S105 is the one on a vehicle which is already received, the position information on the vehicle and the operation information on the vehicle, which are registered in the vehicle information data list M, are updated (Step S107).

Based on the position information on the vehicle and the operation information on the vehicle which are registered in the vehicle information data list M, the vehicle group generation part 25 judges whether a vehicle is among a group or not, which consists of a plurality of vehicles, based on the position on the vehicle and the operation information on the vehicle which are recorded in the vehicle information data list M. For example, when the distance between vehicles is less than 20 m, the information determination part judges that the plurality of vehicles constitute one vehicle group (Step S108).

Next, the drive route operation part 26 judges about the risk of collision, based on the position information and operation information on a plurality of vehicles, which are recorded in the vehicle information data list M. To be more specific, the drive route operation part 26 searches for drive routes of the respective vehicles, based on the vehicle information on each of the plurality of vehicles. Next, the object discrimination part 27 recognizes an object which exists on a drive route, based on the drive routes of respective vehicles, and information on the surroundings. And, when the time until a collision is caused between vehicles is less than a fixed value, for example, the time to the collision is predicted to be less than 5 seconds, the collision judgment part 28 judges that the risk of collision is high (Step S109).

When the risk of collision cannot be neglected, the information determination part 29 selects which vehicle's camera video image to transmit to a warning target vehicle, from among vehicles which constitute a vehicle group, according to the predicted type of collision, where the camera video image is included in the video images which are taken from the second vehicle B and sent in Step S101 (Step S110). And the MEC side transmitting device 22 transmits the selected video image data toward a specific vehicle (Step S111).

The vehicle side receiving device 12, which received the video image data, displays a situation on the display device 13, and notifies a warning by using the warning device 14, when needed (Step S112).

In the MEC side communication system 2, concerning all the vehicles which control the processes of Step S104 to Step S111, information corresponding to respective vehicles is offered. And, driving assistance is conducted according to the latest vehicle information, and old vehicle information is deleted from the vehicle information data list M (Step S113). It is to be noted that, when a warning is notified in Step S112 and thereby the first vehicle A changes a drive route, the change in the vehicle group will occur. Thereby, the MEC side communication system 2 reconstructs a new vehicle group, based on the new position information and operation information. Further, the MEC side communication system returns to Step S108 and assists the driving of a vehicle.

Next, referring to the flow chart of FIG. 3, explanation will be made about how the information determination part 29 selects which vehicle's camera video image to transmit to an assistance target vehicle, from among vehicles which constitute a vehicle group, according to the predicted type of collision.

First, the information determination part identifies the predicted type of collision, which is judged in the collision judgment part 28 (Step S201).

Explanation will be made about a case where the type of assistance is a Do Not Pass Warning (DNPW) and a Forward Collision Warning (FCW).

The information determination part judges that the collision judgment part 28 assumes the collision at the passing time or not (Step S202). When the collision judgment part 28 assumes the collision at the passing time, the information determination part selects the forward video image of a vehicle, where this vehicle is the leading vehicle of a vehicle group which is at the very front of a driving assistance target vehicle (Step S203).

Figure 4:
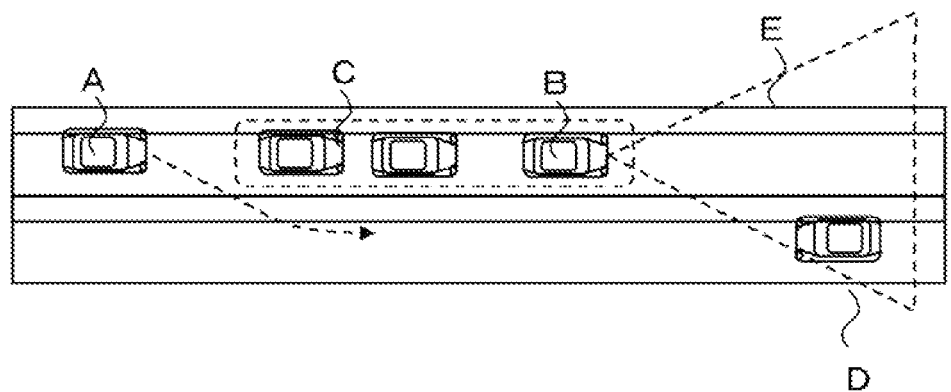
FIG. 4 is a schematic view for explaining the video image information, which will be provided to a vehicle which is about to pass cars ahead.

A case example of the collision which is assumed at the passing time is shown in FIG. 4. In addition, a case example of the collision which is caused to a front vehicle is shown in FIG. 5.

FIG. 4 expresses a case where a vehicle at the tail end is the first vehicle A, a driving assistance target, and this vehicle is assumed to pass a vehicle group C which is at the front. Ahead of the first vehicle A, there exists a vehicle group C, which consists of a bunch of vehicles. This case shows a state where an oncoming vehicle D is coming ahead of the second vehicle B, which is the leading vehicle of a vehicle group.

Figure 5:
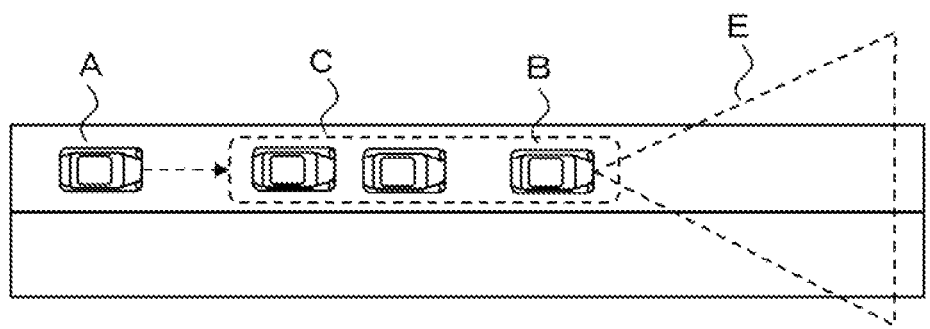
FIG. 5 is a schematic view for explaining the video image information, which will be provided to a vehicle which follows a vehicle group ahead.

Moreover, FIG. 5 expresses a state where the first vehicle A is heading forward to follow the vehicle group C which is in the front. In the case of a collision to a front vehicle, or a collision at the passing time, the vehicle group C, which is at the very front, obstructs the field of vision, and then, a driver cannot recognize the oncoming vehicle D and the front field. Therefore, in order to bring much attention of the driver to a danger, a video image which is taken with the front camera of the second vehicle B is displayed on the first vehicle A, where the second vehicle B is the leading vehicle of a vehicle group. Thereby, the awareness of the driver is promoted. It is to be noted that, in FIG. 4 and FIG. 5, a triangle area, which is denoted by the dashed line, indicates a video image domain E by a camera.

In the following drawings, shown are a first vehicle A which is a host vehicle, a second vehicle B which is a vehicle to offer video image information, a vehicle group C, a vehicle D which is a target vehicle to assume a collision to cause, a video image domain E taken by a camera, and a pedestrian F who is a target person to assume a collision with.

Next, explanation will be made about a case where the type of assistance is an Intersection Movement Assist (IMA), that is, a warning for making a right turn at a street crossing.

Figure 3:
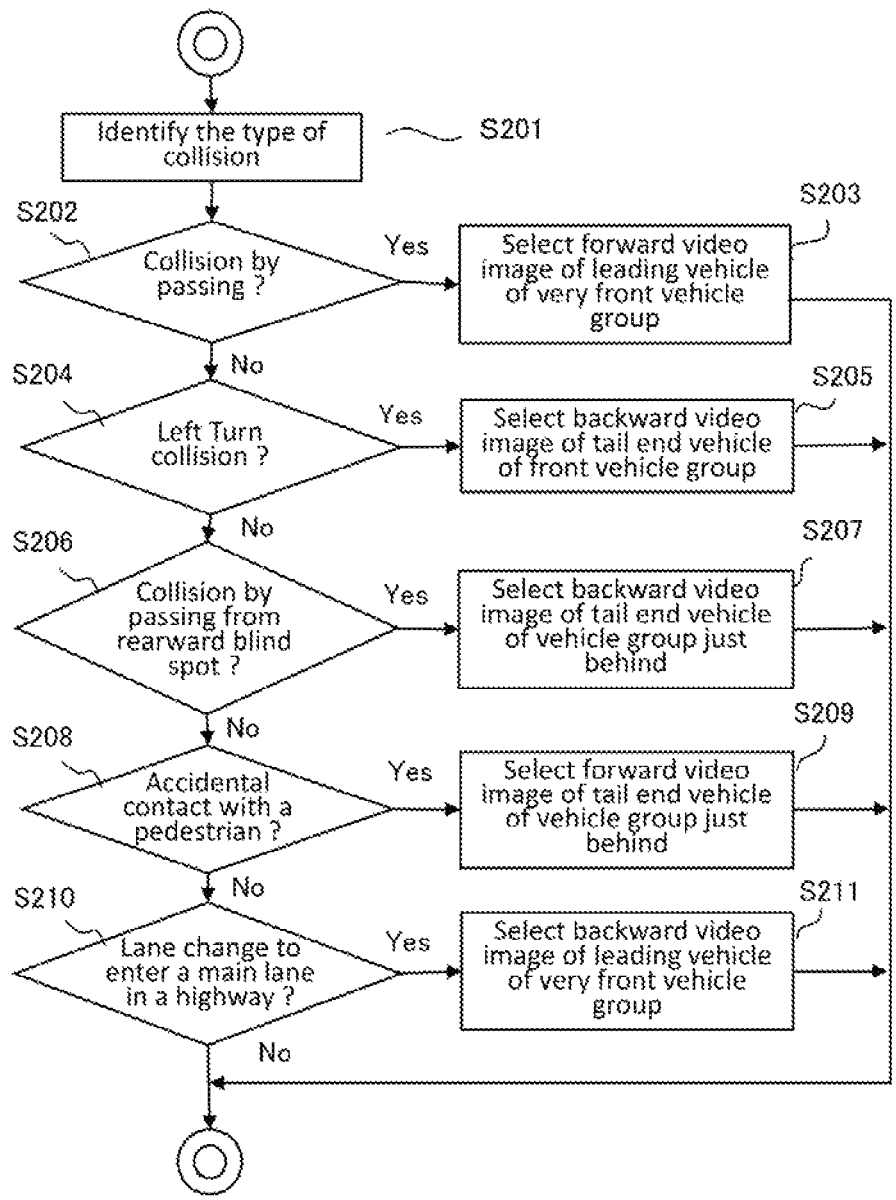
FIG. 3 is a flow chart which shows the operations for video image selection, in the case where a warning of collision is issued, in the vehicle driving assistance system of the Embodiment 1.

The information determination part judges whether the collision judgment part 28 assumes a collision at the time of making a right turn, or not (Step S204 of FIG. 3). When the collision judgment part 28 assumes the collision at the time of making a right turn, the information determination part 29 selects, for the first vehicle A, a video image which is taken with the back camera of the second vehicle B, where the second vehicle B is at the tail end of the vehicle group C, which is at the front of the first vehicle (Step S205 of FIG. 3).

Figure 6:
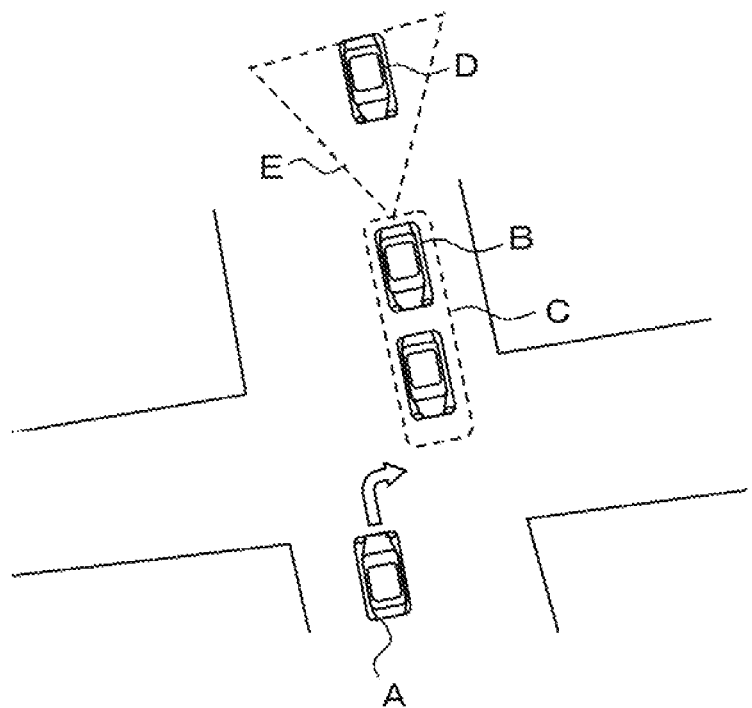
FIG. 6 is a schematic view for explaining the video image information, which will be provided to a vehicle which is about to make a right turn.

FIG. 6 shows a case example of a collision, which is assumed to be caused at the time of making a right turn. FIG. 6 shows the case where the first vehicle A is about to make a right turn at a street crossing. The driver is conscious of the vehicle group C, at the time of making a right turn. However, the drawing indicates that there is a risk of collision, which may be caused by an oncoming vehicle D, approaching from the back of this vehicle group C. In the case of a collision which is caused at the time of making a right turn, the forward vehicle group C obstructs the field of view. Thereby, the driver of the first vehicle A cannot recognize the oncoming vehicle D. Therefore, a video image which is taken with the back camera of the second vehicle B is displayed to a driver, where the second vehicle B is at the tail end of a vehicle group which is in the front, and then, the existence of the oncoming car D can be known to the driver.

Next, explanation will be made about the case where the type of assistance is a Blind Spot Warning (BSW).

The information determination part judges whether the collision judgment part 28 assumes a collision which is caused by the passing from a rearward blind spot, or not (Step S206 of FIG. 3). When the collision judgment part 28 assumes the passing of the vehicle D, which is in the position of the rearward blind spot of the vehicle group C, to which the first vehicle A belongs, the information determination part 29 selects a video image which is taken with the back camera of the second vehicle B, where this second vehicle is at the tail end of the vehicle group C, to which the first vehicle A belongs (Step S207 of FIG. 3).

Figure 7:
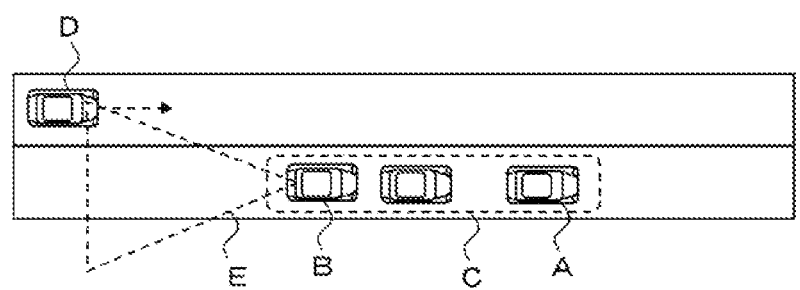
FIG. 7 is a schematic view for explaining the video image information, which will be provided to a vehicle which is to be passed from the back.

FIG. 7 shows an example of the state where the vehicle D, which is in the position of a rearward blind spot, is about to pass. The first vehicle A is one of vehicles which constitute the vehicle group C. In this case, if the first vehicle A does not take care to the vehicle D which is approaching from the rearward of the vehicle group, it is likely that a collision may be caused. In this case where the collision is caused by the passing from a rearward blind spot, it is hard for a driver to recognize a back vehicle. For this reason, a video image which is taken with the back camera of the second vehicle B, which is at the tail end of the vehicle group C, is displayed to draw the attention of a driver.

Next, explanation will be made about the case where the type of assistance is a Left Turn Assistance (LTA).

The information determination part judges whether the collision judgment part 28 assumes, as a type of collision, an accidental contact between the first vehicle A which is about to make a left turn and a person, or not (Step S208 of FIG. 3). When the collision judgment part 28 assumes an accidental contact with a person, the information determination part 29 selects a video image which is taken with the front camera of the second vehicle B, where this second vehicle is at the tail end of the vehicle group C, to which the first vehicle A belongs (Step S209 of FIG. 3).

Figure 8:
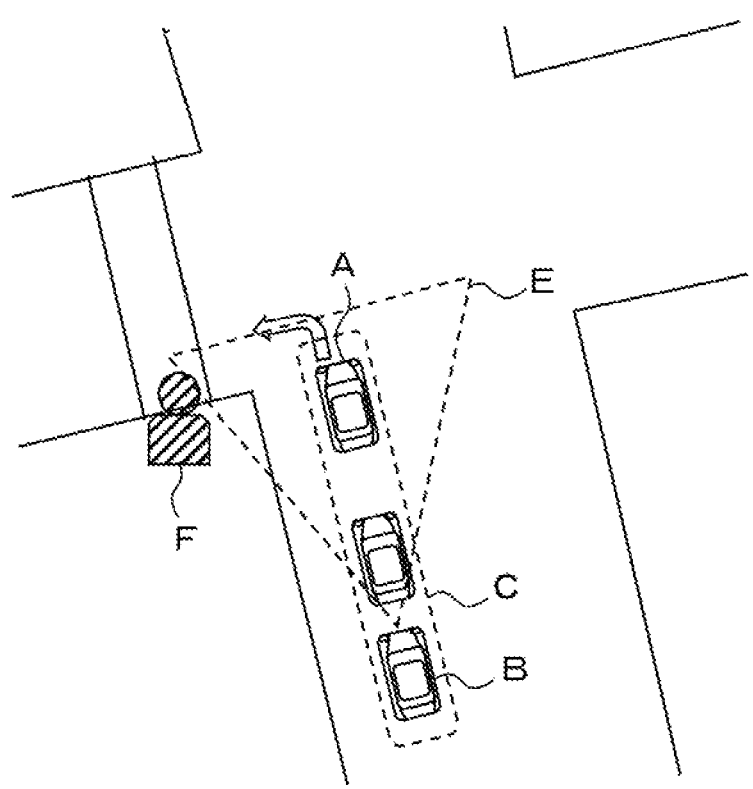
FIG. 8 is a schematic view for explaining the video image information, which will be provided to a vehicle which is about to make a left turn.

FIG. 8 shows a case where an accidental contact is assumed to be caused between the first vehicle A which is about to make a left turn and a pedestrian F (V2P). FIG. 8 expresses a state in which the first vehicle A is at the head of the vehicle group C. When the first vehicle A makes a left turn, the first vehicle is on the verge of contacting the pedestrian F who is just about to cross a pedestrian crossing. An accidental contact with the pedestrian F is likely to be caused, when the pedestrian F is hard to recognize for the first vehicle A. For this reason, the information determination part 29 selects a video image which is taken with the front camera of the second vehicle B, which is at the tail end of the vehicle group C. The video image taken with the front camera of the second vehicle B, which is at the tail end, includes the first vehicle A which is about to make a left turn at a street crossing and the pedestrian F who is about to cross the street crossing. When the driver of the first vehicle A checks this video image, attention of the driver will be drawn to the image.

Next, explanation will be made about the case where the type of assistance is a warning, which is issued when a host vehicle entering the main lane of a highway.

The information determination part judges whether the collision judgment part 28 assumes, as a type of collision, the collision at the time of entering the main lane in a highway, or not (Step S210 of FIG. 3). When the collision judgment part 28 assumes the collision at the time of entering the main lane, the information determination part 29 selects a video image of the back camera of the second vehicle B, where this second vehicle B is the leading vehicle of the vehicle group C, which is ahead of the first vehicle A (Step S211 of FIG. 3).

Figure 9:
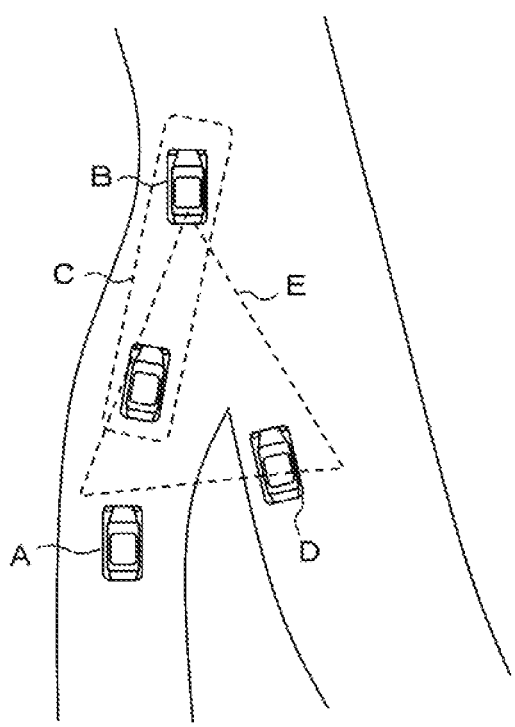
FIG. 9 is a schematic view for explaining the video image information, which will be provided to a vehicle which is about to enter a main lane in a highway.

FIG. 9 is a schematic view for explaining the video image information, which will be offered to a vehicle which is about to enter the main lane of a highway.

When a vehicle enters the main lane in a highway, it is likely that a vehicle group in the front, or the walls of a road, and the like may obstruct the field of vision. For this reason, a driver is hard to recognize the situation of a merging point on the main lane. In this situation, the information determination part 29 selects a video image of the back camera of the second vehicle B, where this second vehicle B is the leading vehicle of the vehicle group C, which is ahead of the first vehicle A. This video image of the back camera of the second vehicle B includes the vehicle D which runs on the main lane and the first vehicle A which is about to enter the main lane.

As mentioned above, in this vehicle driving assistance system, the drive route of an assistance target vehicle is searched for, according to vehicle information. When the object discrimination part recognized that an object exists on a drive route, the information determination part judges whether there is a risk of collision with the object or not. Video image information is selected according to the judged type of collision. The base point side communication system offers the video image information to the vehicle side communication system. Thereby, the amount of information is restricted, and non-tight processing of information can be achieved.

Embodiment 2

In the before mentioned Embodiment 1, the vehicle which is selected by the information determination part 29 of the MEC side communication system 2 is the leading or tail end vehicle of a vehicle group, which is in the frontward or rearward of the first vehicle A. However, in some cases, it becomes suitable to select automatically, as a video image which will be used to warn a danger to the driver of the first vehicle A, the video image of the front camera of the second vehicle B, where the front camera captures the view of a drive route which the first vehicle A is expected to take.

Figure 10:
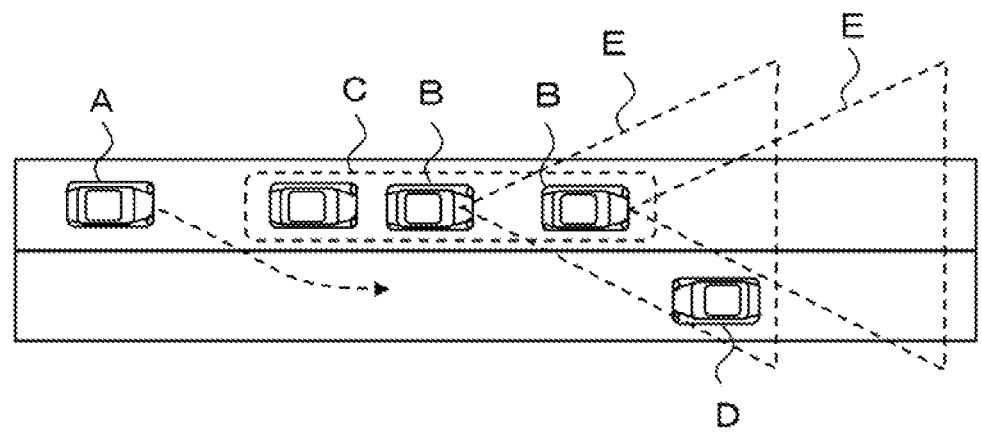
FIG. 10 is a schematic view for explaining the video image information, which will be provided to a vehicle which is about to pass cars ahead.

In FIG. 10, a specific example of this case is shown. FIG. 10 shows the example of a case where a video image is used for avoiding a collision at the passing time. The state which is shown in this FIG. 10 is a state where the first vehicle A at the tail end is about to pass the forward vehicle group C. In this state, the vehicle group C, which is at the very front, obstructs the field of vision. Therefore, a driver cannot recognize the oncoming vehicle D and the front part. Moreover, the oncoming vehicle D stands out of the video image pick up range for the front camera of the second vehicle B, where this second vehicle B is the leading vehicle of the vehicle group C. Thereby, when the MEC side communication system 2 selects only the video image of the front camera of the second vehicle B, where the second vehicle B is the leading vehicle of the vehicle group C, the video image of this front camera will not catch the image of the oncoming vehicle D.

For this reason, when only the video image of the front camera of the leading second vehicle B is transmitted to the driver of the first vehicle A, it is probable that the driver judges that the oncoming vehicle D does not exist, and then, conducts the passing of a vehicle group. In order to avoid this problem, in the Embodiment 2, when the oncoming vehicle D does not exist in the video image of the front camera of the second vehicle B, where the second vehicle B is the leading vehicle of the vehicle group C, the MEC side communication system 2 checks whether there is a video image in which the oncoming vehicle D is caught, or not, other than the leading vehicle of the vehicle group C. The drawing expresses that the video image in which an oncoming vehicle is caught in is selected and will be used.

With reference to the flow chart of FIG. 11, explanation will be made about the operation for selecting the video image in this information determination part 29. It is to be noted that, in this FIG. 11, taken up and explained is the case example in which a warning is issued to the risk of collision, in the case of conducting a passing.

First, the collision judgment part judges about the risk of collision (Step S301). And as shown in the Embodiment 1, the information determination part selects a video image which is taken with the front camera of a vehicle, where this vehicle is the leading vehicle of a vehicle group which is at the very front (Step S302). And the information determination part judges whether the video image of the oncoming car is contained in the selected video image, or not (Step S303).

When the video image of an oncoming car is not contained in the selected video image, the information determination part selects the video image which is taken by the next vehicle in the vehicle group (Step S304). The process in quest of the video image in which an oncoming car is contained is repeated by the front step (Step S303). And when a video image in which an oncoming car is contained is found, the information determination part selects the video image in which an oncoming car is contained (Step S305).

It is to be noted that, also in other collision cases, the video image which is taken by a vehicle belonging to the vehicle group may be replaced one by one, similarly. Thereby, the information determination part can select the video image information in which an oncoming vehicle or a matter to be an obstacle is contained.

Figure 11:
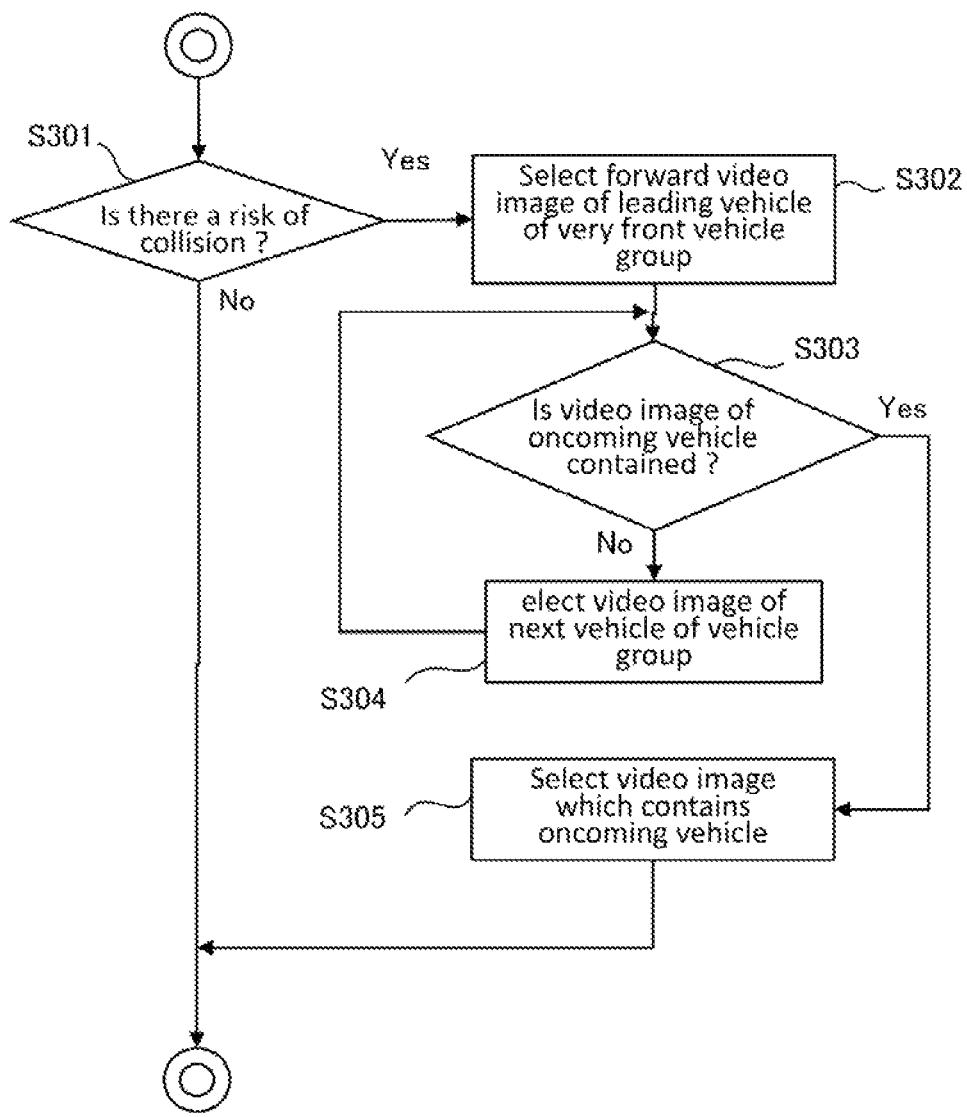
FIG. 11 is a flow chart which shows the operations for video image selection, according to the Embodiment 2.

Moreover, in this FIG. 11, it is explained that the information determination part selects a video image which is taken by the next vehicle in the vehicle group. However, in the case where the first set video image is a forward video image taken by the leading vehicle, it is desirable that the video image of a vehicle to be selected as the next one is a forward video image taken by a vehicle which is at the tail end. That is, if checking of video images is performed, following the order in the moving direction of an oncoming vehicle, a situation may arise where selection of a video image becomes slow depending on the speed of an oncoming vehicle.

Embodiment 3

In the Embodiment 3, reading ahead of an ongoing situation is conducted, also in a scene where a vehicle needs to run on a course which is different from the usual drive route, according to the change in the situation, which is caused by the action of a non-host vehicle. Based on the read ahead result, a video image and a warning are distributed beforehand to a host vehicle, and thereby, a driver can attain the smoother driving. Taking FIG. 12 as an example, explanation will be made about the situation where a vehicle needs to run on a course which is different from the usual drive route, according to the change in the situation, which is caused by the action of the non-host vehicle.

Figure 12:
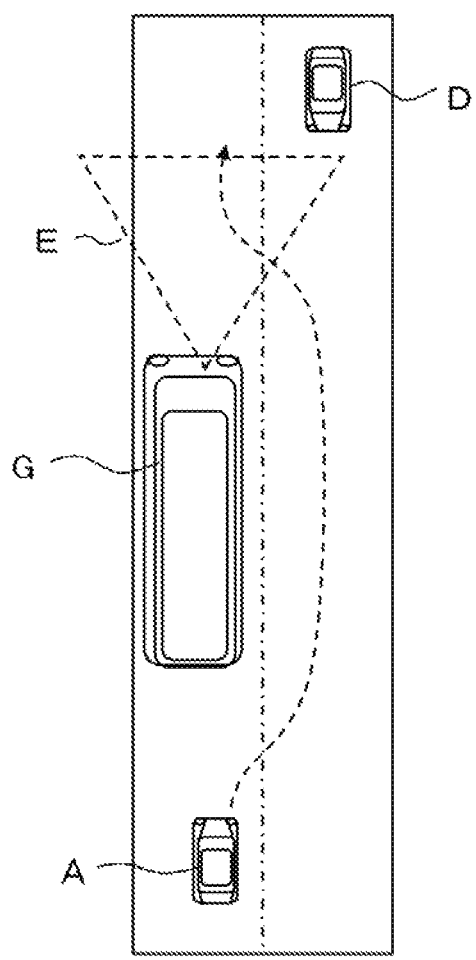
FIG. 12 is a schematic view which shows the example of the driving operation of a vehicle, according to the Embodiment 3.

FIG. 12 shows a case where, on the road of a two-way street, a large sized vehicle, for example, a bus G, which is ahead of the first vehicle A, is running on the course. Under ordinary circumstances, the first vehicle A follows the bus G, as a drive route, and in addition, runs on the drive route which is along a self traffic lane. However, when the change in the situation arises where the bus G stops at a bus stop, the drive route of the first vehicle A will become a drive route which is different from the usual one, where the first vehicle A comes out to the opposite lane, and will conduct the passing of the bus, like the arrow of FIG. 12. In this case, when the oncoming car D is contained in the domain of a video image which is taken with the front camera of the bus G, the video image which is taken with the front camera of the bus G will be transmitted to the first vehicle A, before the first vehicle A comes out to the opposite lane. In addition, a warning will be transmitted to the first vehicle A.

In FIG. 12, as the change in the situation which is caused by the action of a non-host vehicle, explained is the example of a scene where the bus G stops inside a bus stop. However, other scenes can be thought of. For example, those scenes include a case where, when a non-host vehicle which runs in front goes into a parking lot to make a stop, the first vehicle A passes a non-host vehicle, or a case where the first vehicle A passes a tailback, which consists of vehicles going into a parking lot.

Figure 13:
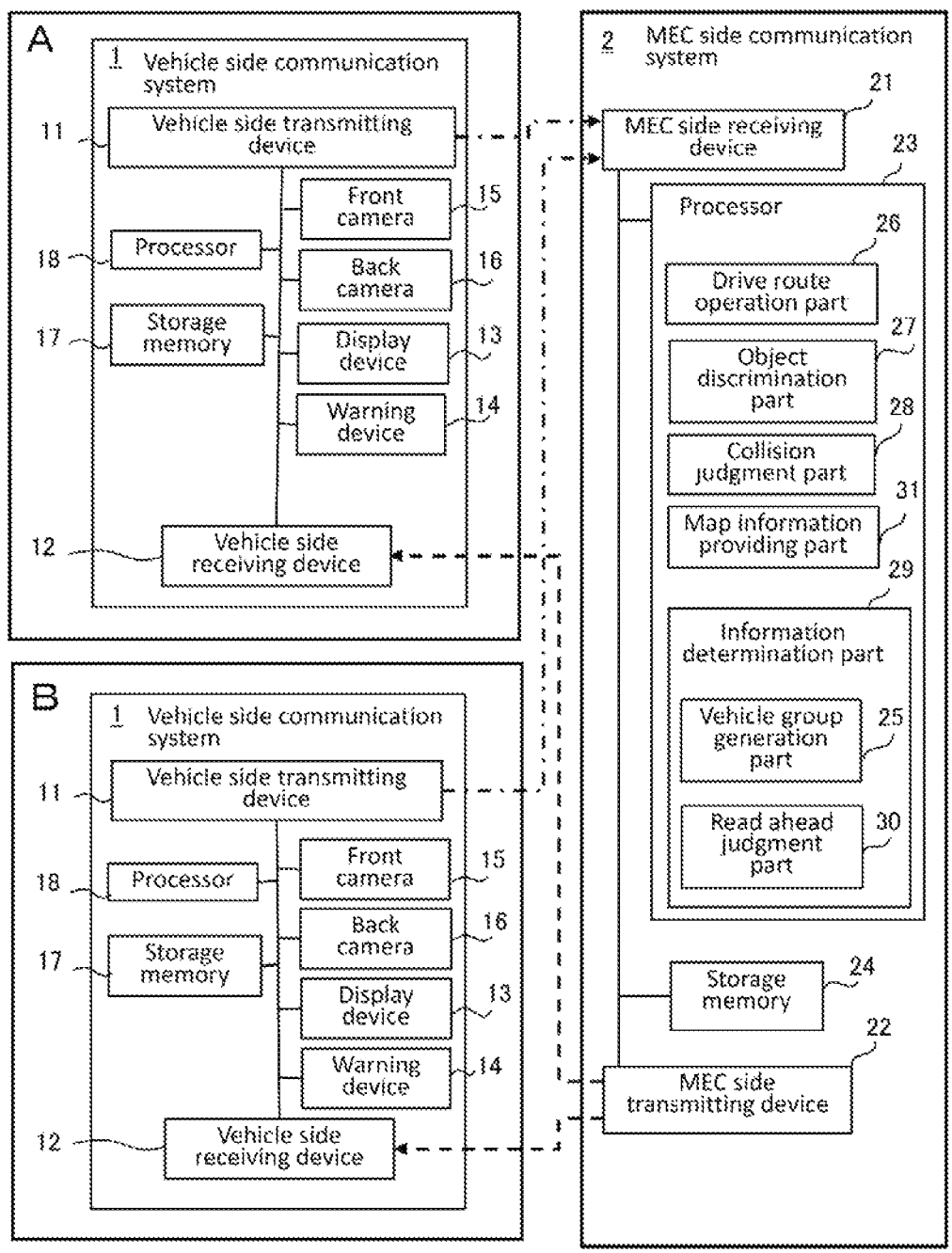
FIG. 13 is a block diagram which shows the configuration of a vehicle driving assistance system, according to the Embodiment 3.

Explanation will be made, using FIG. 13, about the specific configuration of the Embodiment 3. In FIG. 13, a read ahead judgment part 30 and a map information providing part 31 are added to the MEC side communication system 2, which is shown in the block diagram of the Embodiment 1.

Figure 14:
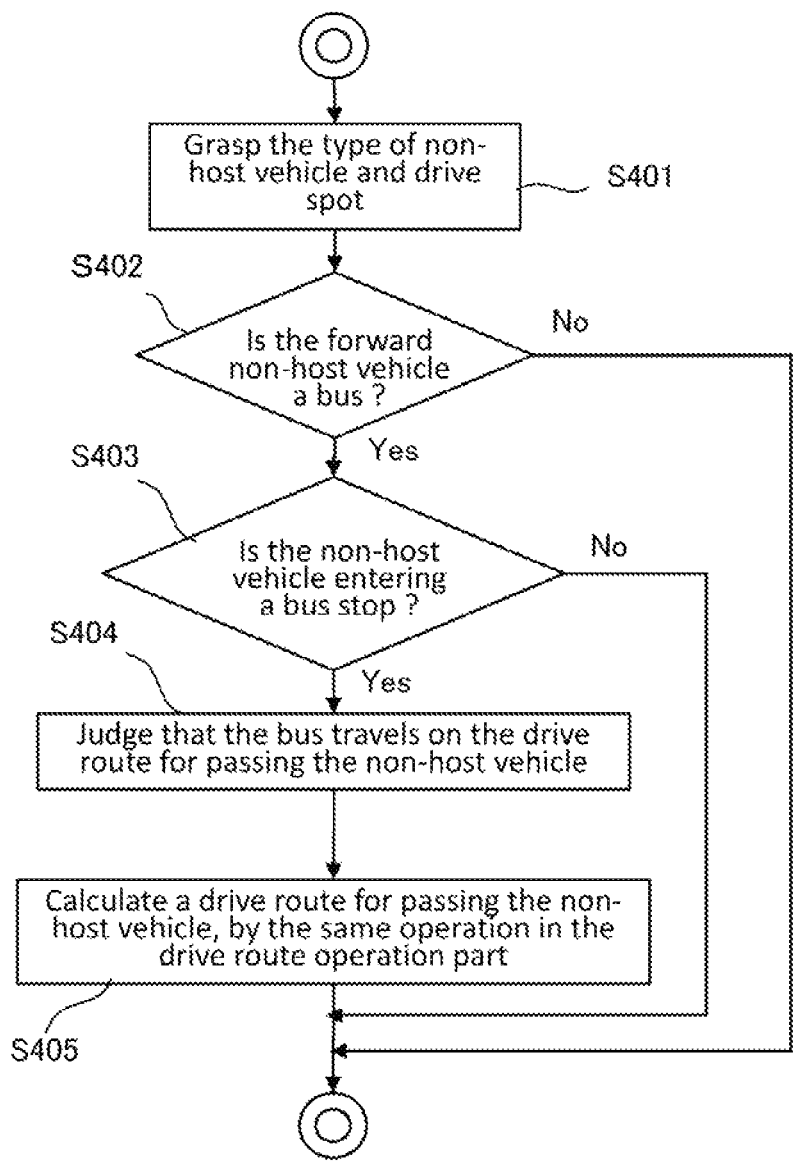
FIG. 14 is a flow chart which shows the operations of the Embodiment 3.

With reference to the flow chart of FIG. 14, explanation will be made about the operations of the Embodiment 3.

The read ahead judgment part 30 uses the information on a drive route which the drive route operation part 26 has, the vehicle information which the MEC side receiving device 21 has, and the map information providing part 31. In addition, the read ahead judgment part 30 judges the situation which is caused by the action of a non-host vehicle, and searches for a drive route which a driver is assumed to select in the encountered situation. The drive route which is assumed in this case turns out to be a drive route which is different from the usual one.

The method for judging the situation which is caused by the action of a non-host vehicle will be explained. In the example of FIG. 12, the MEC side communication system 2 holds a fact that the non-host vehicle of the other side is a bus, by the vehicle information which the MEC side receiving device 21 receives from respective vehicles, and the map information which is provided by the map information providing part 31. Thereby, in the read ahead judgment part 30, it can be recognized that the non-host vehicle of the other side is running the near side of a bus stop (Step S401).

In the read ahead judgment part 30, for example, a rule stating that the bus G makes a stop in a bus stop can be set up beforehand. Thereby, the read ahead judgment part 30 can predict that, when the bus G makes a stop, it is likely that the first vehicle A may pass the bus. Moreover, when the bus G may stop at a place other than a bus stop, a rule needs to be set up which states that, if the bus G slows down and makes a stop, it is likely that the first vehicle A may pass the bus. By setting up this rule, the read ahead judgment part 30 judges whether a vehicle is a bus or not, from the vehicle information on preceding vehicles (Step S402). When a preceding vehicle is a bus, the read ahead judgment part 30 judges whether the vehicle runs and slows down or not, before coming to a stop (Step S403).

And the read ahead judgment part 30 judges whether, by the stop of the preceding bus G, the first vehicle A, running the back of the bus G, takes a drive route or not, which is different from the usual drive route, where the first vehicle A comes out to the opposite lane, and passes the non-host vehicle (Step S404). When the read ahead judgment part 30 has judged in this way, the read ahead judgment part 30 calculates the drive route which is suitable for the encountered situation, like the drive route operation part 26 (Step S405). The drive route which is calculated in the read ahead judgment part 30 turns out to be a drive route which is different from the usual one. Like the usual drive route which the drive route operation part 26 calculates, this drive route is processed so that the driving operation of the first vehicle A may be assisted by the object discrimination part 27, the collision judgment part 28, the information determination part 29, and the MEC side transmitting device 22.

Namely, in the Embodiment 1, the driving assistance sets up, beforehand, assistances, according to various situations which are assumed under ordinary circumstances, based on the drive route which is searched for from the vehicle information on the first vehicle A. The MEC side communication system 2 selects video image information which is suitable for the assistance, from the video image information which is transmitted by near-by vehicles, and the video image information is provided from the MEC side transmitting device 22 to the vehicle side communication system 1. In contrast, according to the Embodiment 3, it is assumed that the first vehicle A may take a drive route, which is different from the drive route, which is searched for from the vehicle information. As the counterplan, the read ahead judgment part is configured to read ahead the change of a drive route, and the MEC side communication system performs an assistance which is in accordance with the change.

Embodiment 4

In the Embodiment 4, as a vehicle side communication system which is used in a vehicle driving assistance system, explanation will be made about an in-vehicle driving assistance device, which includes an in-vehicle device, having a communication function, and receives, by the communication between vehicles, the vehicle information and video image information on a non-host vehicle, existing on the outskirts, and assists the driving operation of a host vehicle.

In the Embodiments 1-3, explanation was made about the vehicle side communication system which operates based on the driving assistance information, which is received from the base point side communication system, that is, the base point side driving assistance device. However, in this Embodiment 4, the vehicle side communication system has the function of the base point side driving assistance device, and the vehicle information and video image information on a non-host vehicle is taken into the driving run of the host vehicle. Thereby, the in-vehicle driving assistance device which assist the driving of the host vehicle can be achieved.

Using drawings, explanation will be made about the Embodiment 4. It is to be noted that, the same or corresponding portions are denoted by the same reference character, in the drawings.

Figure 15:
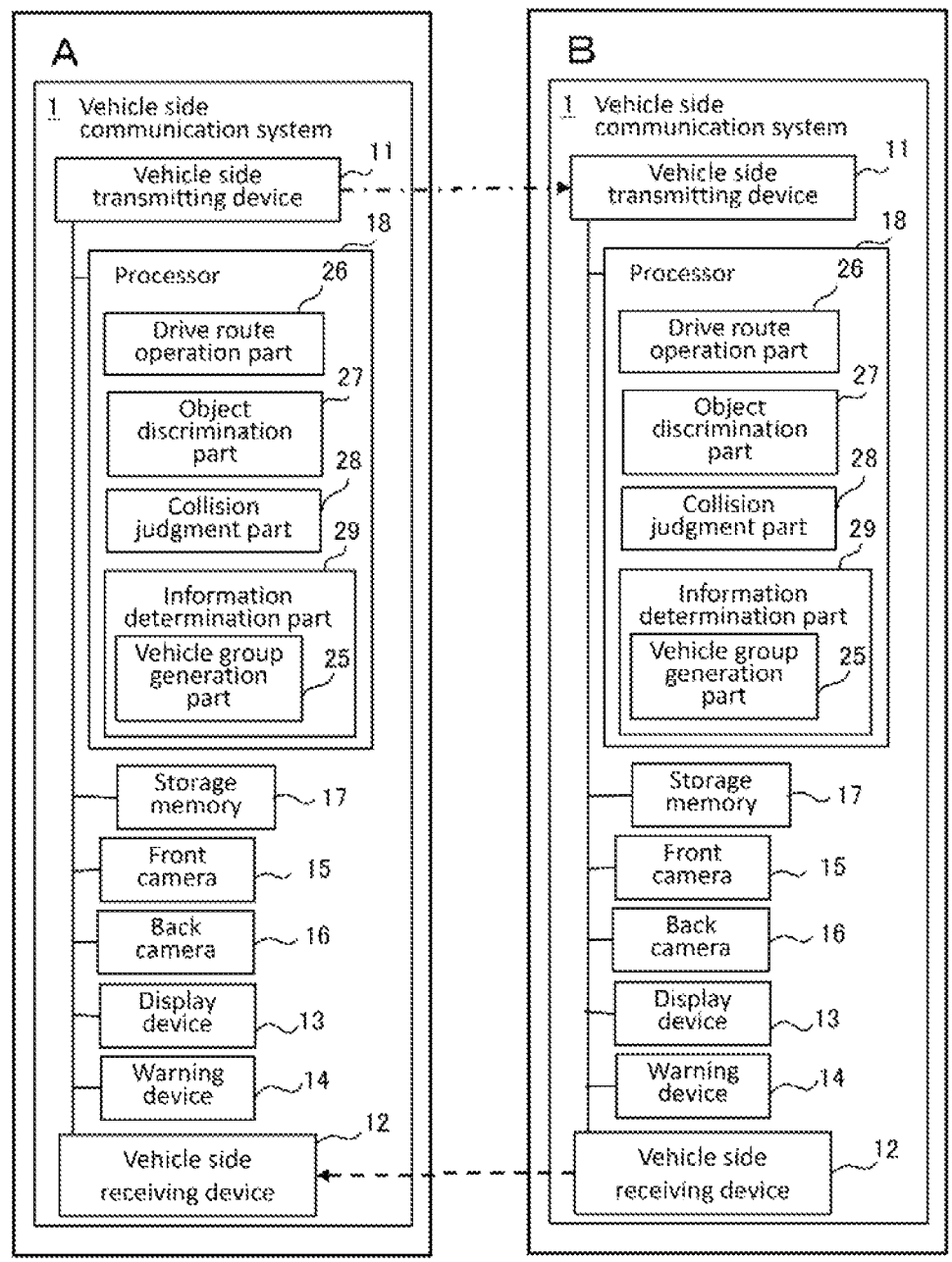
FIG. 15 is a block diagram which shows the configuration of a vehicle driving assistance system, according to the Embodiment 4.

FIG. 15 is a block diagram showing the configuration of a vehicle driving assistance system. In the Embodiment 4, the vehicle side communication system 1, which is an in-vehicle driving assistance device and mounted in a vehicle, plays that role of the vehicle driving assistance system.

The in-vehicle driving assistance device, namely, the vehicle side communication system 1, is mounted in a vehicle and used there. The configuration of this vehicle side communication system 1 includes: a vehicle side transmitting device 11 which transmits, to a non-host vehicle, the vehicle information and video image information on a host vehicle which mounts on this vehicle side transmitting device; a vehicle side receiving device 12 which receives the vehicle information and video image information, sent from a non-host vehicle; a display device 13 which displays a video image; a warning device 14 which issues a warning when the information is the urgent one; a front camera 15 which captures the images of the front side of the host vehicle; and a back camera 16 which captures the images of the rear side of the host vehicle. Moreover, the operations of the display device 13, the warning device 14, the front camera 15, and the back camera 16 are controlled by the processor 18 and the storage memory 17. That is, the processor 18 is configured so that the function to control a plurality of devices may be achieved, by executing the program which is inputted from the storage memory 17.

It is to be noted that, vehicle information which is transmitted from the vehicle side communication system 1 of the first vehicle A to the second vehicle B is the position information on a vehicle, and the operation information on a vehicle. The position information on a vehicle is the information on the current position of a vehicle, such as the information on a latitude and a longitude. The operation information on a vehicle is the driving operation information, such as "stop," "speed of travelling," "rate of acceleration," and "direction of travelling," which are caused by an accelerator operation, a brake operation, and a wheel operation.

Moreover, the vehicle information and the video image information which is taken with the front camera 15 and the back camera 16 of the second vehicle B are transmitted, from the vehicle side communication system 1 of the second vehicle B, to the vehicle side communication system 1 of the first vehicle A.

The vehicle information and the video image information are memorized in the storage memory 17, by the processor 18, at a fixed time interval, according to the driving operation of a vehicle.

Moreover, information which is transmitted from a non-host vehicle is received by the vehicle side receiving device 12 and memorized in the storage memory 17. In addition, the information is used for assisting the driving of a vehicle, according to the contents of the received information, whereby various kinds of devices mounted in the vehicle are controlled by the processor 18.

The vehicle side communication system 1 is mounted on both of the first vehicle A and the second vehicle B, and both of the first vehicle A and the second vehicle B transmit the vehicle information and the video image information mutually.

The vehicle side communication system 1 of the first vehicle A is equipped with a vehicle side receiving device 12, which receives the vehicle information and video image information which is sent from the vehicle side transmitting device 11.

The vehicle side communication system 1 of the first vehicle A identifies a vehicle, based on the vehicle information which is received from the second vehicle B, and searches for the drive route of the second vehicle B. According to the drive route of the second vehicle B, the vehicle side communication system 1 analyzes the information which is needed for the driving assistance of a host vehicle, i.e., the first vehicle A, and provides, based on an analysis result, the driver of the host vehicle, with the information which is considered to be effective in the driving assistance.

The vehicle side communication system 1 of the first vehicle A is made up with a processor 18 and a storage memory 7, which are connected to a bus. The processor 18 executes the program which is inputted from the storage memory 17. The processor 18 is configured so that the function of the vehicle group generation part 25, the drive route operation part 26, the object discrimination part 27, the collision judgment part 28, and the information determination part 29 may be achieved, by executing the program.

The vehicle group generation part 25 is contained in the information determination part 29, and judges the condition of a group, the aggregation of a plurality of vehicles, based on each vehicle information on the plurality of vehicles, which the vehicle side receiving device 12 of the first vehicle A receives, and generates the information on the vehicle group. Here, the vehicle group is a group of vehicles which is judged to be related with, when the first vehicle A runs the drive route of the first vehicle A.

The drive route operation part 26 searches for respective drive routes of second vehicles B, which constitute a vehicle group, based on the vehicle information which the first vehicle A receives. As for the drive route of the first vehicle A, since the first vehicle A is a host vehicle, the drive route can be acquired from the GPS equipment of the host vehicle and the information on the operation equipment.

The object discrimination part 27 recognizes an object which exists on the drive route of a vehicle, based on the information on the drive route of the first vehicle A.

When the object discrimination part 27 recognizes an object existing on the drive route of the first vehicle A, the collision judgment part 28 judges about whether there is a risk of collision between the first vehicle A and the object, or not.

When the collision judgment part 28 judges that there is a risk of collision between the first vehicle A and the object, an assistance to warn that there exists this risk is called for. For example, this assistance includes Do Not Pass Warning (DNPW), Forward Collision Warning (FCW), Intersection Movement Assist (IMA), Blind Spot Warning (BSW), Left Turn Assist (LTA), Vehicle to Pedestrian (V2P), and Lane Change Warning.

The information determination part 29 selects which vehicle's camera video image to transmit to a warning target vehicle, from among the vehicles which constitute a vehicle group, according to the type of collision which is judged by the collision judgment part 28. The camera video image which is selected here is transmitted from the second vehicle B to the first vehicle A.

Figure 16:
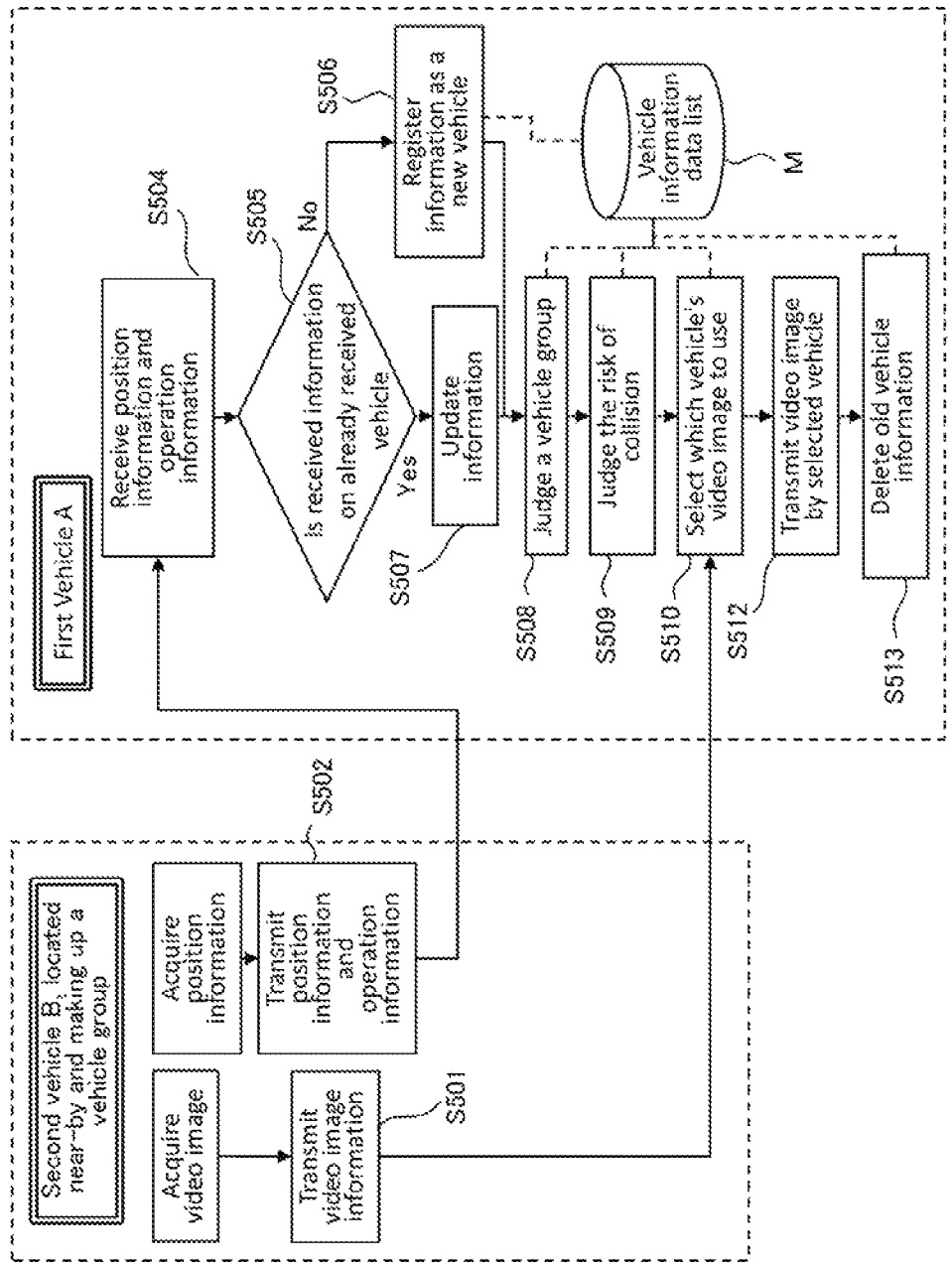
FIG. 16 is a flow chart which shows the operations of the Embodiment 4.

Next, with reference to the flow chart of FIG. 16, explanation will be made about the operations of the Embodiment 1, which is configured in this way.

Here, the vehicle which performs vehicle driving assistance is denoted as a first vehicle A. Explained is the case where, near this first vehicle A, located is a second vehicle B, as a near-by vehicle, which makes up a vehicle group.

First, in the second vehicle B which makes up a vehicle group, when video images are acquired with the front camera 15 and the back camera 16, video image information will be transmitted to the first vehicle A, by the vehicle side transmitting device 11 (Step S501). Moreover, in the second vehicle B which makes up a vehicle group, the operation information and the position information which is acquired with the in-car GPS equipment are transmitted to the vehicle A (Step S502).

The first vehicle A, which is an assistance target, transmits, to the vehicle B, the operation information on the vehicle and the position information which is acquired with the in-car GPS equipment (Step S503).

In the first vehicle A, vehicle information on the second vehicle B is received (Step S504). The first vehicle A judges whether the received vehicle information is the information on the already received vehicle, or not (Step S505).

When the received vehicle information is not in agreement with the information on the already received vehicle, the first vehicle A registers the received vehicle information in the vehicle information data list M, as new vehicle information (Step S506).

When the first vehicle A judges that the vehicle information received in Step S505 is the information on the already received vehicle, the first vehicle A updates the position information on the vehicle and the operation information on the vehicle which are registered in the vehicle information data list M (Step S507).

Based on the position information on the vehicle and the operation information on the vehicle which are registered in the vehicle information data list M, the vehicle group generation part 25 judges whether a vehicle is in a group or not, which is consisted of a plurality of vehicles, based on the position information on the vehicle and the operation information on the vehicle which are recorded in the vehicle information data list M. For example, when the distance between vehicles is less than 20 m, the vehicle group generation part 25 judges that a plurality of vehicles constitute one vehicle group (Step S508).

Next, the drive route operation part 26 judges about the risk of collision, based on the position information and operation information on a plurality of vehicles which are recorded on the vehicle information data list M. More specifically, the drive route operation part 26 searches for the drive routes of respective vehicles, based on the vehicle information on each of a plurality of vehicles. Next, the object discrimination part 27 recognizes an object which exists on a drive route, based on the drive routes of respective vehicles and information on the surroundings. And, when the time until a collision is caused between vehicles is less than a fixed value, for example, the time to the collision is predicted to be less than 5 seconds, the collision judgment part 28 judges that the risk of collision is high (Step S509).

When the risk of collision cannot be neglected, the information determination part 29 selects which vehicle's camera video image to display, from among vehicles which constitute a vehicle group, according to the predicted type of collision, where the camera video image is included in video images which are taken from the second vehicle B and are sent in Step S501 (Step S510).

The vehicle side receiving device 12, which received the video image data, displays a situation on the display device 13, and notifies a warning with the warning device 14, when needed (Step S512).

In the first vehicle A, concerning all the vehicles which control the processes of Step S504 to Step S511, information corresponding to respective vehicles is offered. And, driving assistance is performed according to the latest vehicle information, and old vehicle information is deleted from the vehicle information data list M (Step S513). It is to be noted that, when a warning is notified in Step S512 and thereby the first vehicle A changes a drive route, the change in the vehicle group will occur. The vehicle side communication system 1, as an in-vehicle driving assistance device, reconstructs a new vehicle group, based on the new position information and operation information. Further, the vehicle side communication system returns to Step S508 and assists the driving of a vehicle.

It is to be noted that, in the example of the Embodiment 4, explanation is made about a case where the first vehicle A and the second vehicle B respectively hold a first in-vehicle driving assistance device and a second in-vehicle driving assistance device, which make no difference in the function. However, even in a case where only the first vehicle A, i.e., a host vehicle carries an in-vehicle driving assistance device, the first vehicle A can collect the position information and the video image information which near-by vehicles transmit, with the vehicle side receiving device 12. The first vehicle A judges whether a vehicle group is the one which is related with at the run time or not, from a relation with the drive route of a host vehicle, and then, the vehicle driving assistance system can perform the required driving assistance, such as a warning.

As mentioned above, in this vehicle driving assistance system, the drive route of an assistance target vehicle is searched for according to the vehicle information. When the object discrimination part recognized that an object exists on a drive route, the information determination part judges whether there is a risk of collision with the object, or not. Video image information is selected according to the judged type of collision, and the second vehicle B provides the selected video image information to the first vehicle A. Thereby, the vehicle driving assistance system can be achieved.

Moreover, in the base point side driving assistance device, concerning a plurality of vehicles, when there is a risk of collision, in response to the vehicle information and video image information on respective vehicles, operation can be assisted by providing a vehicle with required video image information.

Furthermore, in the in-vehicle driving assistance device, when there is an object which has the risk of collision on a drive route, while a host vehicle runs on the drive route, the video image information which assists the driving can be selected from the video image information which a non-host vehicle holds, and can be provided for a driver.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

EXPLANATION OF NUMERALS AND SYMBOLS

1 Vehicle side communication system, 2 MEC side communication system, 11 Vehicle side transmitting device, 12 Vehicle side receiving device, 13 Display device, 14 Warning device, 15 Front camera, 16 Back camera, 17 Storage memory, 18 Processor, 21 MEC side receiving device, 22 MEC side transmitting device, 23 Processor, 24 Storage memory, 25 Vehicle group generation part, 26 Drive route operation part, 27 Object discrimination part, 28 Collision judgment part, 29 Information determination part, 30 Read ahead judgment part, 31 Map information providing part

What is claimed is:
1. A vehicle driving assistance system comprising:
a vehicle side communication system which is mounted in at least a first vehicle and transmits vehicle information and video image information, and
a base point side communication system which is provided in a base point and transmits driving assistance information which is selected out, according to the vehicle information,
wherein the base point side communication system includes at least one processor; and at least one memory including computer program code, when executed, causes the at least one processor to:
receive the vehicle information and the video image information from a plurality of vehicles including the first vehicle,
search for a drive route of the first vehicle, from the vehicle information,
recognize an object existing on the drive route, which is searched for by the drive route,
determine whether there is a risk of collision with the object or not, based on recognizing that the object exists on the drive route, and, based on determining that there is a risk of collision, determine a type of collision with the object;
select video image information for transmitting, from video image information which is received from a vehicle different from the first vehicle, according to the type of collision, and
transmit, based on determining that there is a risk of collision, the video image information to the first vehicle.

2. The vehicle driving assistance system according to claim 1, wherein the vehicle information is position information on the first vehicle and operation information on the first vehicle, where the first vehicle is a driving assistance target.

3. The vehicle driving assistance system according to claim 1, wherein determining whether there is a risk of collision further comprises determining whether a time until collision is lower than a threshold value.

4. The vehicle driving assistance system according to claim 2,
wherein the video image information is a video image which is taken with a front camera mounted in the vehicle and a back camera mounted in the vehicle,
wherein selecting the video image information comprises selecting video image information, based on the drive route of the first vehicle, from the video image information which is offered from the vehicle different from the first vehicle, and
wherein the base point side communication system is further configured to perform driving assistance by offering the video image information, from the base point side communication system to the first vehicle.

5. The vehicle driving assistance system according to claim 4,
wherein, wherein selecting the video image information further comprises, when the driving assistance according to the drive route of the first vehicle is a Do Not Pass Warning, selecting video image information which is taken with a front camera of a leading vehicle of a vehicle group which is at the very front of the first vehicle.

6. The vehicle driving assistance system according to claim 4,
wherein, wherein selecting the video image information further comprises, when the driving assistance according to the drive route of the first vehicle is an Intersection Movement Assist, selecting a video image which is taken with a back camera of a tail end vehicle of a vehicle group, which is ahead of the first vehicle.

7. The vehicle driving assistance system according to claim 4,
wherein, wherein selecting the video image information further comprises, when the driving assistance according to the drive route of the first vehicle is a Blind Spot Warning, selecting a video image which is taken with a back camera of a tail end vehicle of a vehicle group, to which the first vehicle belongs.

8. The vehicle driving assistance system according to claim 4,
wherein, wherein selecting the video image information further comprises, when the driving assistance according to the drive route of the first vehicle is a Left Turn Alert, selecting a video image which is taken with a front camera of a tail end vehicle of a vehicle group, to which the first vehicle belongs.

9. The vehicle driving assistance system according to claim 4,
wherein, wherein selecting the video image information further comprises, when the driving assistance according to the drive route of the first vehicle is a Lane Change Warning, selecting a video image which is taken with a back camera of a leading vehicle of a vehicle group, which is ahead of the first vehicle.

10. The vehicle driving assistance system according to claim 4,
wherein, when the driving assistance according to the drive route of the first vehicle deals with a case where a selected video image information does not include an object existing on a drive route, selecting the video image information further comprises changing the video image information from vehicles of a vehicle group, and changing to the video image information in which an object exists, and using the video image information.

11. The vehicle driving assistance system according to claim 4,
wherein the base point side communication system is further configured to offer map information, and
assumes that the first vehicle takes a drive route which is different from the drive route searched for by the vehicle information, based on the map information, and
performs the driving assistance according to a change of the drive route.

12. The vehicle driving assistance system according to claim 11, wherein the program code is further configured to cause the processor to construct, based on the position information on the first vehicle and operation information on the first vehicle, a vehicle group.

13. The vehicle driving assistance system according to claim 12, wherein the program code is further configured to cause the processor to reconstruct the vehicle group, based on the change of the drive route, and based on updated position information on the first vehicle and updated operation information on the first vehicle associated with the change of the drive route.

14. A base point side driving assistance device, comprising at least one processor; and
at least one memory including computer program code, when executed, causes the at least one processor to:
receive vehicle information and video image information from a plurality of vehicles including a first vehicle,
search for a drive route of the first vehicle from the vehicle information,
recognize an object existing on the drive route, which is searched for by the drive route operator,
determine whether there is a risk of collision with the object or not, based on recognizing that the object exists on the drive route, and, based on determining that there is a risk of collision, determine a type of collision with the object;

select video image information for transmitting, from the video image information received from a vehicle different from the first vehicle, according to the type of collision, and a transmitter which transmits, based on determining that there is a risk of collision, the video image information to the vehicle.

\* \* \* \* \*